(12) United States Patent
Lin

(10) Patent No.: US 7,043,844 B2
(45) Date of Patent: May 16, 2006

(54) MAGNETIC ATTRACTABLE SPOON

(76) Inventor: Mu Hsiang Lin, 235 Chung-Ho Box 8-24, Taipei (TW)

(*) Notice: Subject to any disclaimer, the term of this patent is extended or adjusted under 35 U.S.C. 154(b) by 0 days.

(21) Appl. No.: 10/900,438

(22) Filed: Jul. 28, 2004

(65) Prior Publication Data

US 2006/0021233 A1    Feb. 2, 2006

(51) Int. Cl.
*A47G 21/04*    (2006.01)
(52) U.S. Cl. .................. 30/298.4; 30/324; 30/327
(58) Field of Classification Search .......... 30/323, 30/327, 298.4, 324; 220/912, 915, 737
See application file for complete search history.

(56) References Cited

U.S. PATENT DOCUMENTS

| | | | | |
|---|---|---|---|---|
| 4,317,284 A | * | 3/1982 | Prindle | .................. 30/340 |
| 5,105,963 A | * | 4/1992 | Scott | .................. 220/735 |
| 2005/0056655 A1 | * | 3/2005 | Gary | .................. 220/737 |

FOREIGN PATENT DOCUMENTS

| | | | |
|---|---|---|---|
| DE | 2004-012779 U1 | * | 12/2004 |
| JP | 11-309074 A | * | 11/1999 |
| JP | 2004-121792 A | * | 4/2004 |
| KR | 2003-080970 A | * | 10/2003 |

* cited by examiner

*Primary Examiner*—Hwei-Siu C. Payer

(57) ABSTRACT

A magnetic attractable spoon comprises a tie ring having a hole; a spoon combined to the hole of the tie ring; and at least one magnet installed to the tie ring for attracting metal objects. The tie ring is elastic. The tie ring has at least one embedding groove for embedding the magnet. The magnet is enclosed within the tie ring. A plurality of magnets are annularly arranged along an edge of the tie ring. The tie ring is combined to an annular body of the tie ring and the tie ring has an annular attracting surface. The hole of the tie ring is not a penetrating hole. The tie ring has a plane attracting surface or a cambered attracting surface.

4 Claims, 3 Drawing Sheets

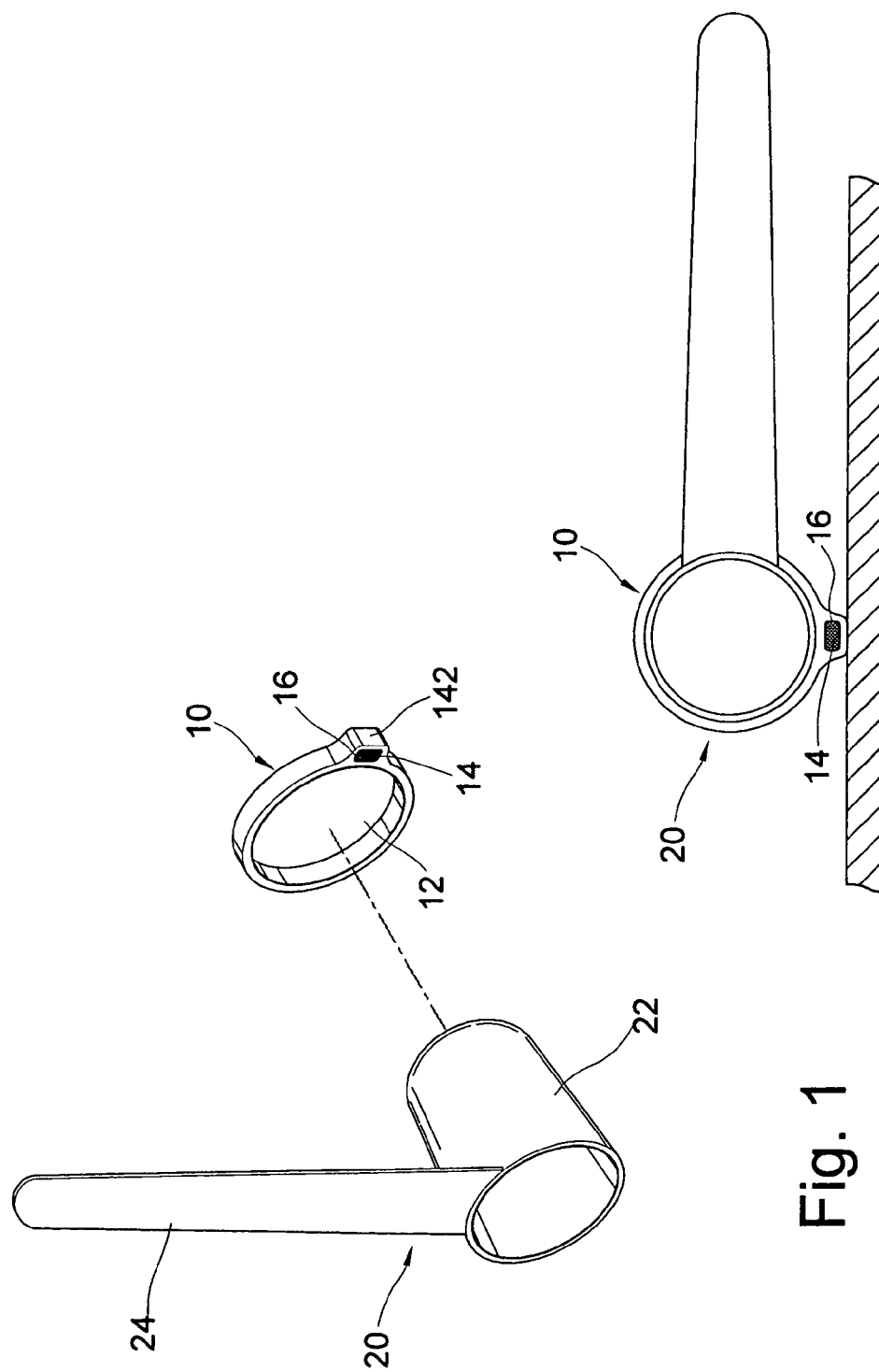

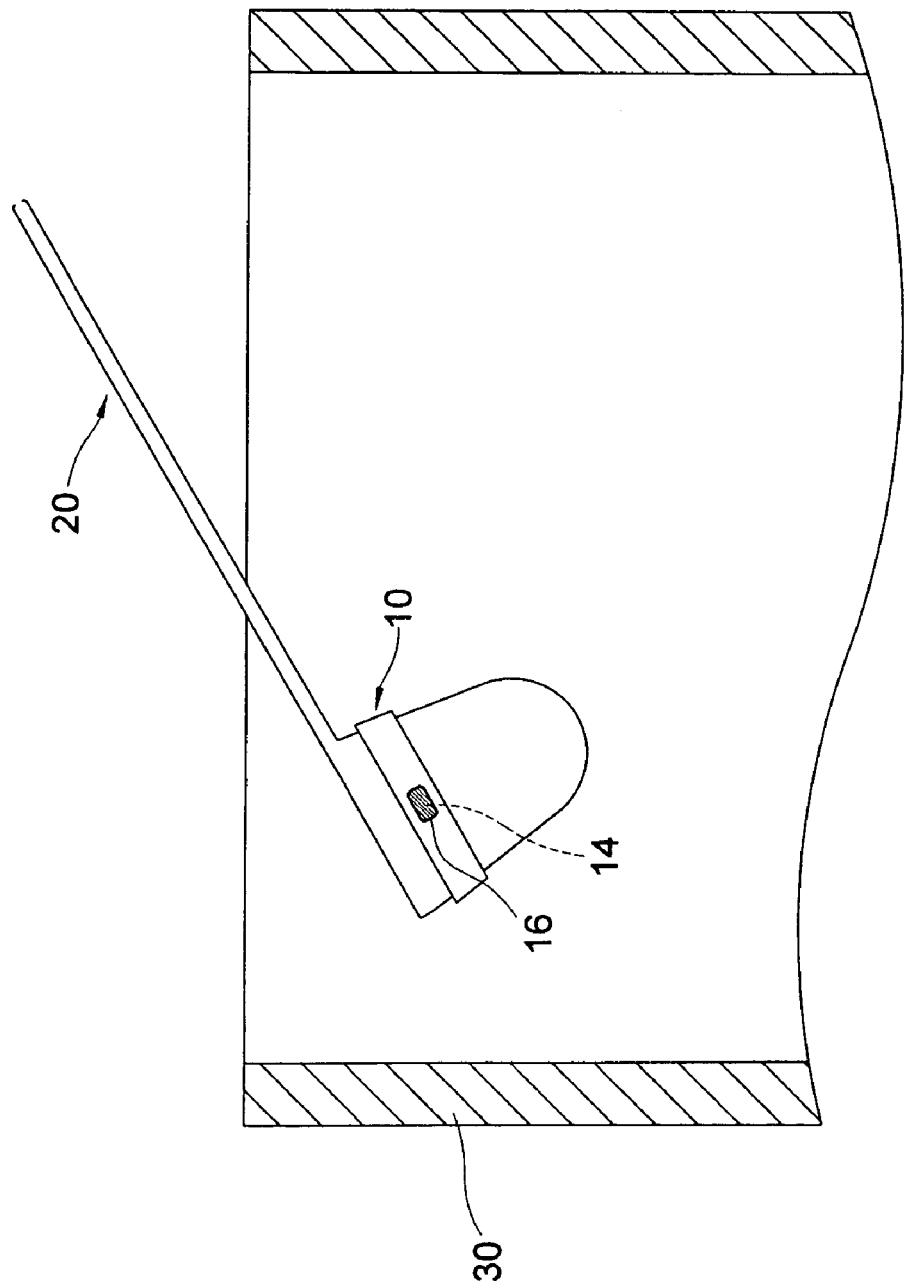

MAGNETIC ATTRACTABLE SPOON

FIELD OF THE INVENTION

The present invention relates to spoons, and particular to a magnetic attractable spoon which is mainly used to a milk can so that the spoon can attracted to the milk can easily and can be taken out quickly.

BACKGROUND OF THE INVENTION

For the longer time, it makes a trouble to take a spoon from a milk can since it is often that the spoon is embedded into the milk can.

In one improvement for above mentioned problem is to make buckles to the spoon and the milk can so that the spoon can be buckled to the backside of a cover of a milk can. Thereby, the spoon can be taken easily.

However, this encounters a problem, that is, to change the structure of the cover of a milk can and the structure of the spoon must be agreed by the manufacturer. Moreover, the buckling of the cover and spoon must keep attention to the orientations of the covers and the spoons.

SUMMARY OF THE INVENTION

Accordingly, the primary object of the present invention is to provide a magnetic attractable spoon, wherein the magnetic attractable spoon can be attractive to or separated from a milk can without needing the change of structure of the milk spoon.

To achieve above objects, the present invention provides a magnetic attractable spoon which comprises a tie ring having a hole; a spoon for being assembled to a spoon; the spoon being combined to the hole of the tie ring; and at least one magnet installed to the tie ring for attracting metal objects. The tie ring is elastic. The tie ring has at least one embedding groove for embedding the magnet. The magnet is enclosed within the tie ring. A plurality of magnets are annularly arranged along an edge of the tie ring. The tie ring is combined to an annular body of the tie ring and the tie ring has an annular attracting surface. Moreover, in the present invention, the hole of the tie ring can be a non-penetrating hole. The tie ring has a plane attracting surface or a cambered attracting surface.

The various objects and advantages of the present invention will be more readily understood from the following detailed description when read in conjunction with the appended drawing.

BRIEF DESCRIPTION OF THE DRAWINGS

FIG. 1 is a structural schematic view of the present invention.

FIGS. 2 and 3 are schematic views showing the application of the present invention.

DETAILED DESCRIPTION OF THE INVENTION

Figure 6:
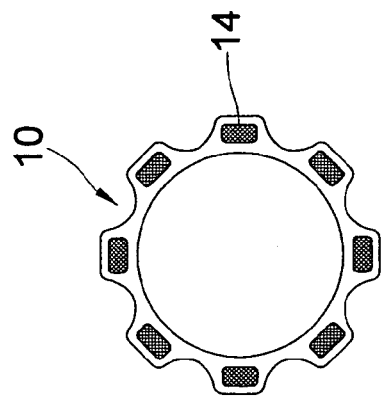
FIG. 6 shows a further embodiment of the present invention.

In order that those skilled in the art can further understand the present invention, a description will be described in the following in details. However, these descriptions and the appended drawings are only used to cause those skilled in the art to understand the objects, features, and characteristics of the present invention, but not to be used to confine the scope and spirit of the present invention defined in the appended claims.

Referring to FIG. 1, the structure of the present invention is illustrated. The present invention comprises the following elements.

A tie ring 10 serves for being assembled to a spoon 20. The tie ring 10 has a hole 12 for receiving a ladle 22 or a handle 24 of the spoon 20 so as to be combined with the tie ring 10 as an integral body.

Figure 4:
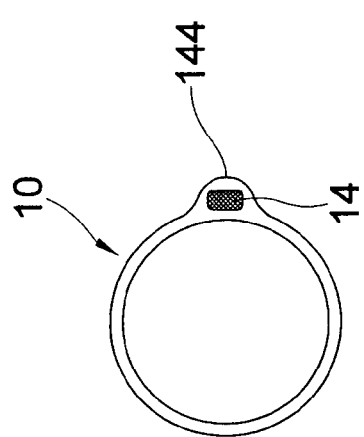
FIG. 4 shows the details of the application of the present invention.

An outer edge or internal of the tie ring 10 is installed with at least one magnet 14. Thereby, as shown in FIGS. 2, 3, by the magnet 14, the tie ring 10 can be combined to an attracted object 30, such as a milk can or other metal objects. Thereby, it can be combined to or separated from the attracted object 30 quickly. The attracted surface 142 combined to the magnet 14 can be a plane, or a cambered surface, as shown in FIG. 4.

In the drawing, the hole 12 is a penetrating hole for combining the tie ring 10 to the spoon 20. However, the hole 12 may be a recess so that the tie ring 10 is only installed to the edge of the spoon 20 or the handle 24.

Besides, the hole 12 of the tie ring 10 is designed to tightly engage the spoon 20 or is elastic so that the tie ring 10 can be expanded so as to change the size of the hole 12.

Figure 5:
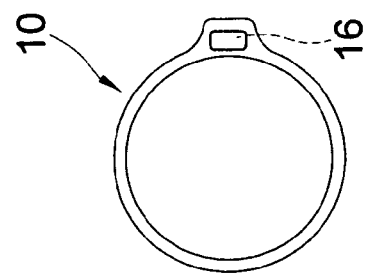
FIG. 5 shows another embodiment of the present invention.

With reference to FIG. 1, an edge of the tie ring 10 has at least one embedding groove 16 for embedding the magnet 14. In realization, as shown in FIG. 5, the magnet 14 can be enclosed within the tie ring 10. In the present invention, there may be several magnets 14 being installed within the tie ring 10. Referring to FIG. 6, there are a plurality of magnets 14 annularly arranged along an outer edge or near the outer edge of the tie ring 10.

However, in the present invention, it is unnecessary to change the structure of the spoon 20, the spoon 20 can attract an attracted object 30 quickly.

Furthermore, in the present invention, the tie ring is combined to an annular body of the tie ring and the tie ring has an annular attracting surface.

The present invention is thus described, it will be obvious that the same may be varied in many ways. Such variations are not to be regarded as a departure from the spirit and scope of the present invention, and all such modifications as would be obvious to one skilled in the art are intended to be included within the scope of the following claims.

The invention claimed is:

1. A magnetic attractable spoon comprising:
   a tie ring having a hole and at least one embedding groove;
   a spoon having a ladle for receiving objects thereon and a handle; the ladle being enclosed by the hole of the tie ring; and
   at least one magnet installed in the at least one embedding groove of the tie ring for attracting metal objects;
   wherein the tie ring is elastic.

2. The magnetic attractable spoon as claimed in claim 1, wherein there are a plurality of embedding grooves which are formed around the hole; and each embedding groove is received with a respective magnet.

3. The magnetic attractable spoon as claimed in claim 1, wherein the tie ring has a plane attracting surface.

4. The magnetic attractable spoon as claimed in claim 1, wherein the tie ring has a cambered attracting surface.

* * * * *